United States Patent
Atkinson et al.

(10) Patent No.: US 10,275,292 B1
(45) Date of Patent: Apr. 30, 2019

(54) SHADOW JAVA CLASSES PROVIDE PRIVATE METADATA

(71) Applicant: NORTHROP GRUMMAN SYSTEMS CORPORATION, Falls Church, VA (US)

(72) Inventors: Timothy J. Atkinson, Palm Bay, FL (US); Douglas M. Dyer, Indialantic, FL (US); Alex Garcia, Melbourne, FL (US)

(73) Assignee: Northrup Grumman Systems Corporation, Falls Church, VA (US)

(*) Notice: Subject to any disclaimer, the term of this patent is extended or adjusted under 35 U.S.C. 154(b) by 198 days.

(21) Appl. No.: 15/634,389

(22) Filed: Jun. 27, 2017

(51) Int. Cl.
  *G06F 9/54* (2006.01)

(52) U.S. Cl.
  CPC .................... *G06F 9/541* (2013.01)

(58) Field of Classification Search
  None
  See application file for complete search history.

(56) References Cited

U.S. PATENT DOCUMENTS

| | | | | |
|---|---|---|---|---|
| 6,973,625 B1* | 12/2005 | Lupo | ................ | G06F 8/38 715/744 |
| 9,141,442 B1* | 9/2015 | Voelcker | ................ | G06F 8/30 |
| 2004/0064825 A1* | 4/2004 | Lim | ................ | G06F 9/4493 719/319 |
| 2005/0154978 A1* | 7/2005 | Albornoz | ................ | G06F 17/218 715/237 |
| 2007/0124334 A1* | 5/2007 | Pepin | ................ | G06F 8/73 |
| 2012/0324432 A1* | 12/2012 | Mizrachi | ................ | G06F 11/3624 717/162 |
| 2016/0085520 A1* | 3/2016 | Zhao | ................ | G06F 8/35 717/105 |

* cited by examiner

*Primary Examiner* — Tuan C Dao
(74) *Attorney, Agent, or Firm* — John A. Miller; Shumaker, Loop & Kendrick, LLP

(57) ABSTRACT

A method for using shadow Java classes to provide private metadata in an application. An XML schema defining a public API is used by a generator to create the public API data classes and a corresponding set of shadow classes. The shadow classes contain metadata describing each corresponding API class, including overall class metadata, and metadata pertaining to each field in the class. When a public class is to be encoded and sent out over the wire, the encoder looks up the shadow metadata—which includes the class structure and eliminates the need to use Java reflection to expand the class. The encoder then walks through the fields of the class and encodes the object—using shorthand simplifications enabled by the metadata. The encoding process is fast because of the avoidance of reflection, and the encoded data is compact due to the simplifications. A similar process is used for de-serializing.

20 Claims, 9 Drawing Sheets

```
StringWriter writer = new StringWriter();
JAXBContext jaxbContext = JAXBContext.newInstance(Sample.class);
Marshaller jaxbMarshaller = jaxbContext.createMarshaller();
jaxbMarshaller.marshal(sample, writer);
```

FIGURE 3

```
<xs:complexType name="Sample">
  <xs:sequence>
    <xs:element name="UpTime" type="xs:double"/>
    <xs:element name="Message" type="xs:string"/>
    <xs:element name="Data" type="xs:hexBinary" minOccurs="0"/>
  </xs:sequence>
</xs:complexType>
```

FIGURE 5

```
@XmlAccessorType(XmlAccessType.FIELD)
@XmlType(name = "Sample", propOrder = {
    "upTime",
    "message",
    "data"
})
public class Sample implements Serializable, Cloneable
{

@XmlElement(name = "UpTime")
    private double upTime;
    @XmlElement(name = "Message", required = true)
    private String message;
    @XmlElement(name = "Data", type = String.class)
    @XmlJavaTypeAdapter(HexBinaryAdapter.class)
    @XmlSchemaType(name = "hexBinary")
    private byte[] data;
    /**
     * The {@code serialVersionUID} indicates the class version ID
     * used for serialization.
     */
    private final static long serialVersionUID = -6782061392418387208L;

/**
     * Gets the value of the upTime property.
     *
     */
    public double getUpTime() {
        return upTime;
    }

/**
     * Sets the value of the upTime property.
     *
     */
    public void setUpTime(double value) {
        this.upTime = value;
    }
```

FIGURE 6

```
static class SampleXml
{
    DataContainer serialize(Sample s)
    {
        DataContainer data = new DataContainer(1000, 1000);
        data.write("<Sample>");
        data.write("<UpTime>" + s.getUpTime() + "</UpTime>");
        data.write("<Message>" + s.getMessage() + "</Message>");
        data.write("<Data>" +s.getData()+ "</Data>");
        data.write("</Sample>");
        return data;
    }
}
```

FIGURE 7

```
XmlEncoder encoder = new XmlEncoder();
encoder.encode(sample, data);

JsonEncoder encoder1 = new JsonEncoder();
encoder1.encode(sample, data);

AsnlEncoder encoder2 = new AsnlEncoder();
encoder2.encode(sample, data);
```

FIGURE 10

```
public class Sample extends IType
{
    public DoubleField UpTime = new DoubleField(
            types.Sample.class,
            "UpTime",
            null,
            false,
            false,
            NamespaceInfo.SAMPLE_TAG,
            NamespaceInfo.SAMPLE,
            2);
    public StringField Message = new StringField(
            types.Sample.class,
            "Message",
            null,
            false,
            false,
            NamespaceInfo.SAMPLE_TAG,
            NamespaceInfo.SAMPLE,
            1);
    public ByteArrayField Data = new ByteArrayField(
            types.Sample.class,
            "Data",
            null,
            true,
            false,
            true,
            NamespaceInfo.SAMPLE_TAG,
            NamespaceInfo.SAMPLE,
            0);

public Sample()
    {
    m_name = "Sample";
    m_namespace = NamespaceInfo.SAMPLE;
    m_preferredTag = NamespaceInfo.SAMPLE_TAG;
    m_code = 22;
    m_type = types.Sample.class;
    m_fields = new Field[] {UpTime,Message,Data};
    }
}
```

FIGURE 9

SHADOW JAVA CLASSES PROVIDE PRIVATE METADATA

BACKGROUND

Field

This invention relates generally to a method for serializing XML-schema-defined data in a Java application and, more particularly, to a method for improving the efficiency of serialization and deserialization of data defined by an XML schema in an API-compliant Java application, where the serialized data is encoded based on private metadata according to a set of proprietary business rules, and the private metadata is defined in shadow Java classes which correspond to the public API-defined classes.

Discussion

A common methodology used by system integrators—including manufacturers of cars, airplanes and other products—is to define an Application Program Interface (API) which describes how various classes of data, used or provided by subsystem manufacturer application programs, are to be formatted so as to be usable by other applications. A common technique used in APIs is to define data classes as XML schema. APIs of this sort are also used by developers of large software systems, such Enterprise Resource Planning (ERP) systems.

In order to have an application be usable as a subsystem in the overall integrated system, a developer must be compliant with the API. One approach that may be taken by a developer of a compliant application is to simply write the XML data, exactly as described in the API schema, out to "the wire" (network, data bus, etc.) where it can be read by other compliant applications. Java Architecture for XML Binding (JAXB) is a Java extension designed to serialize to (encode) and deserialize from (decode) XML. Given an XML schema, a JAXB generator can be used to write Java script for encoding and decoding the XML data.

However, XML is one of the slowest and most voluminous encoding formats available. Also JAXB relies purely on reflection to expand class structures, thus making it one of the slowest encoders available. As a result, an application which simply writes API-compliant XML data out to the wire will run slowly and produce undesirably large encoded data outputs, particularly if the classes of data to be output are large and complex.

An alternative to the above is to create a generator which copies field-by-field the JAXB class and places it into internal structure. Another alternative is to create large lists of lookup tables to go from the first metadata to the second. These brute force approaches may be practical on a small scale, but are time-consuming with large message lists.

For systems specified such that the API is standardized but the wire protocol is not, a technique is needed which uses streamlined, fast-executing code to encode/decode data which is formatted as compactly as possible for transport over the wire.

SUMMARY

The present invention discloses and describes a system and method for using shadow Java classes to provide private metadata in an application. An XML schema defining a public API is used by a generator to create both the public API data classes and a 1:1 corresponding set of shadow classes. The shadow classes contain metadata describing each corresponding API class, including overall class metadata, and metadata pertaining to each field in the class structure. When a public class is to be encoded and sent out over the wire, the encoder looks up the shadow metadata—which includes the class structure and eliminates the need to use Java reflection to expand the class. The encoder can then walk down through the fields of the class and encode the object—using shorthand simplifications enabled by the metadata. The encoding process is fast because of the avoidance of reflection, and the encoded data is compact due to the simplifications. A similar process is used for de-serializing.

Additional features of the present invention will become apparent from the following description and appended claims, taken in conjunction with the accompanying drawings.

BRIEF DESCRIPTION OF THE DRAWINGS

FIG. 3 is a program listing of an example of JAXB setup calls to encode an object;

FIG. 5 is a listing of a Sample XML message defined as a schema element, as would be included in a public API;

FIG. 6 is a listing showing a partial JAXB output from the Sample XML document of FIG. 5, as would be produced by a JAXB generator;

FIG. 7 is a listing of an encoding-specific class to take the Sample XML message and encode it as XML;

FIG. 9 is a listing of an example of metadata for the Sample class shown in FIGS. 5-7;

FIG. 10 is a listing showing what three different encoder calls might look like in the private implementation of FIG. 8.

DETAILED DESCRIPTION OF THE EMBODIMENTS

The following discussion of the embodiments of the invention directed to a system and method for using shadow Java classes providing private metadata for efficient encoding/decoding is merely exemplary in nature, and is in no way intended to limit the invention or its applications or uses. For example, the discussion below describes an implementation in Java; however, the same techniques may be applicable in other programming languages.

An Application Program Interface (API) is a type of standard which defines rules that enable application programs developed by many different developers to work together in an integrated system. APIs are used by manufacturers of products—such as automobiles and aircraft—to allow interoperation of various subsystems and components. APIs are also used by enterprise software developers to enable integration with other applications.

Figure 1:
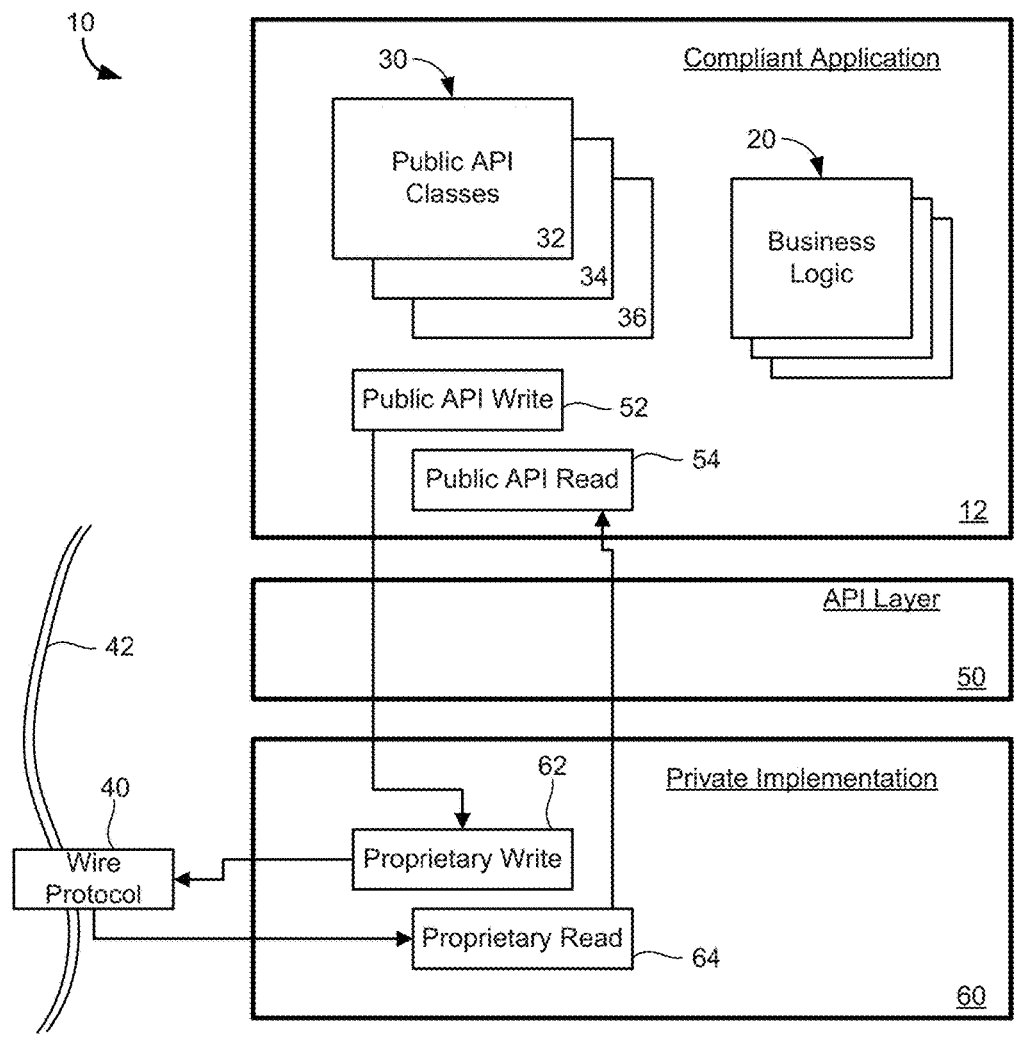
FIG. 1 is a simple illustration of an API-compliant application which is part of a larger integrated system.

FIG. 1 is a simple illustration of an architecture 10 including an API-compliant application 12 which is part of a larger integrated system. The application 12 includes business logic 20, which is a set of business rules, technical formulas, etc. which define what the application 12 does. In order to be API-compliant, the application 12 must follow a data model described in the API in terms of public data classes 30—including specific classes 32, 34, 36, etc. For example, if the overall system is an aircraft, and the application 12 controls a navigation system on the aircraft, the data class 32 might be aircraft position which would be of interest to the application 12. Aircraft position would in turn have sub-classes or data fields such as latitude, longitude, altitude, etc. The definition of the data class and field structure is included in the API.

The architecture 10 includes an API layer 50, which simply represents a layer across which the application 12 communicates in an API-compliant manner. That is, only the public API data classes 30 may be communicated in and out of the application 12 across the API layer 50.

The architecture 10 also includes a private implementation 60. The private implementation 60 is designed to communicate with the application 12 across the API layer 50. The private implementation 60 is a program module which handles encoding and decoding of the data which the application 12 wishes to share with other applications.

The application 12 communicates with other applications in the system over a wire 42 (a data bus, or other type of network) having a wire protocol 40. That is, any data that the application 12 wants to share with, or obtain from, another application is written to or read from the wire 42. One option for the developer of the application 12 is to simply write out any data to the wire 42 exactly as the data classes 30 are defined in the API. In this case, the application 12 calls a public API write module 52 to write the data classes 30 in an API-compliant manner across the API layer 50 to a proprietary write module 62. The proprietary write module 62 writes the data from the API classes 30 to the wire 42 in a manner which is dependent on how the wire protocol 40 is specified. This is often known as encoding or serializing.

Likewise, a proprietary read module 64 reads (decodes) data from the wire 42 and transfers the API-compliant data to a public API read module 54 in the compliant application 12, where the public API data classes are then updated.

Figure 2:
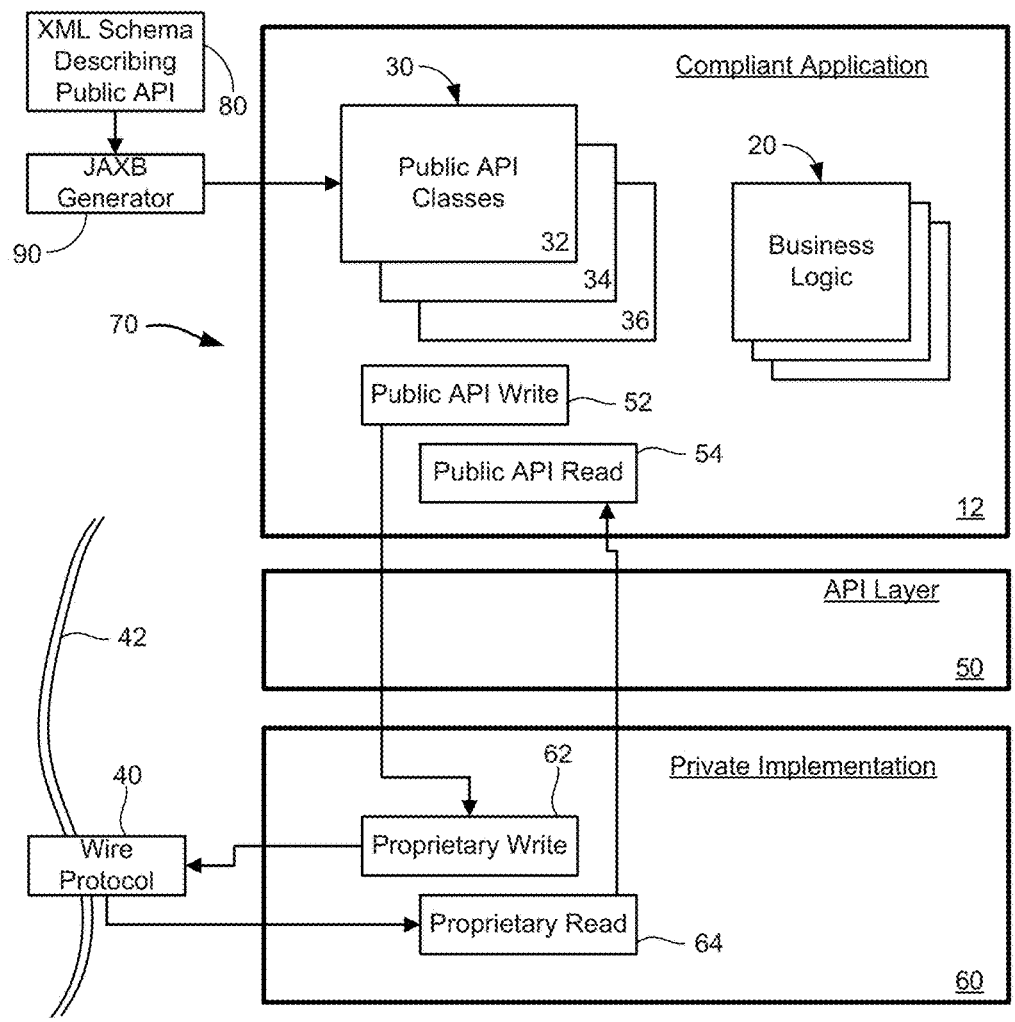
FIG. 2 is an illustration of the API-compliant application of FIG. 1 and showing how a JAXB generator can be used to write the data classes described as XML schema in the API.

A common technique used in APIs is to define the data classes 30 as XML schema. FIG. 2 is an illustration of an architecture 70 including the API-compliant application 12 of FIG. 1 showing a straightforward implementation of XML data output to the wire 42. An XML schema 80 serves as a specification document which describes the public API data classes for the entire integrated system of which the application 12 is a part. As mentioned above, the data standards typically include a data class and field hierarchy for the public classes 30 (32, 34, 36, etc.).

One approach that may be taken by the developer of the API-compliant application 12 is to simply write the XML data, exactly as described in the API schema, out to the wire 42 where it can be read by other compliant applications. Java Architecture for XML Binding (JAXB) is a software framework that allows Java developers to map Java classes to XML representations. JAXB provides two main features: the ability to marshal (encode or serialize) Java objects into XML and the inverse, i.e. to unmarshal (decode) XML back into Java objects. In other words, JAXB allows storing and retrieving data in memory in any XML format, without the need to implement a specific set of XML loading and saving routines for the program's class structure.

The JAXB technology allows Java classes which have been marked up with special annotation flags to serialize into valid, well-formed XML. That is, the XML produced by these marked up Java classes when serialized can be validated against a schema; and as long as a valid, well-formed XML document is presented to these classes, they can de-serialize back into the above Java classes.

These Java classes are almost never written by hand when an XML schema is presented as a specification. Instead, a JAXB generator 90 can be used to write the API classes 30 and the calls for encoding and decoding the XML data. That is, the JAXB generator 90 generates the Java script for creating the data classes 30 and the write module 52. When the application 12 wants to share a piece of data such as the data class 32, the public API write module 52 sends the API-compliant data to the proprietary write module 62 which writes it as encoded XML out to the wire 42. Similarly, XML data from the wire 42 is read and decoded in the proprietary read module 64, then transferred to the public API read module 54 where the API data classes 30 are updated.

The known technique illustrated in FIGS. 1-2 offers a simple and straightforward way for the compliant application 12 to share XML data over the wire 42. However, there are drawbacks with the existing technique. First, XML is one of the slowest and most voluminous encoding formats available. Encoding to either JSON or ASN.1 is typically faster than XML encoding, and also produces smaller encoded object sizes. Encoding to a proprietary binary format has been demonstrated to be still faster and more efficient—with encoding times and encoded object sizes around an order of magnitude better than XML encoding.

Second, JAXB relies purely on reflection to expand class structures, thus making it one of the slowest encoders available. Java reflection makes it possible to inspect classes, interfaces, fields and methods at runtime, without knowing the names of the classes, fields, etc. at compile time. In other words, reflection allows asking if an object exists and, if so, calling other routines with the object as a parameter to get information about the object. It is also possible to instantiate new objects, invoke methods and get/set field values using reflection.

Although reflection can be a powerful tool, it can be very slow when used at runtime to expand an unknown class structure in preparation for encoding, as illustrated in the following discussion. The JAXB technology uses Java reflection and Java annotations to take the Java objects and serialize/de-serialize (encode/decode) them. FIG. 3 is a listing 100 of an example of JAXB setup calls to encode an object. As shown in FIG. 3, the library writer has four steps to serialize one of the standard library calls: 1) create a container to hold the serialized object, in this case a String-Writer; 2) create a JAXB context passing the class to the context; 3) create a marshaller; and 4) finally serialize the object using the marshaller. The marshalling described in FIG. 3 is performed in the proprietary write module 62 of FIGS. 1-2—that is, the encoding of the data to write out to the wire 42.

Figure 4:
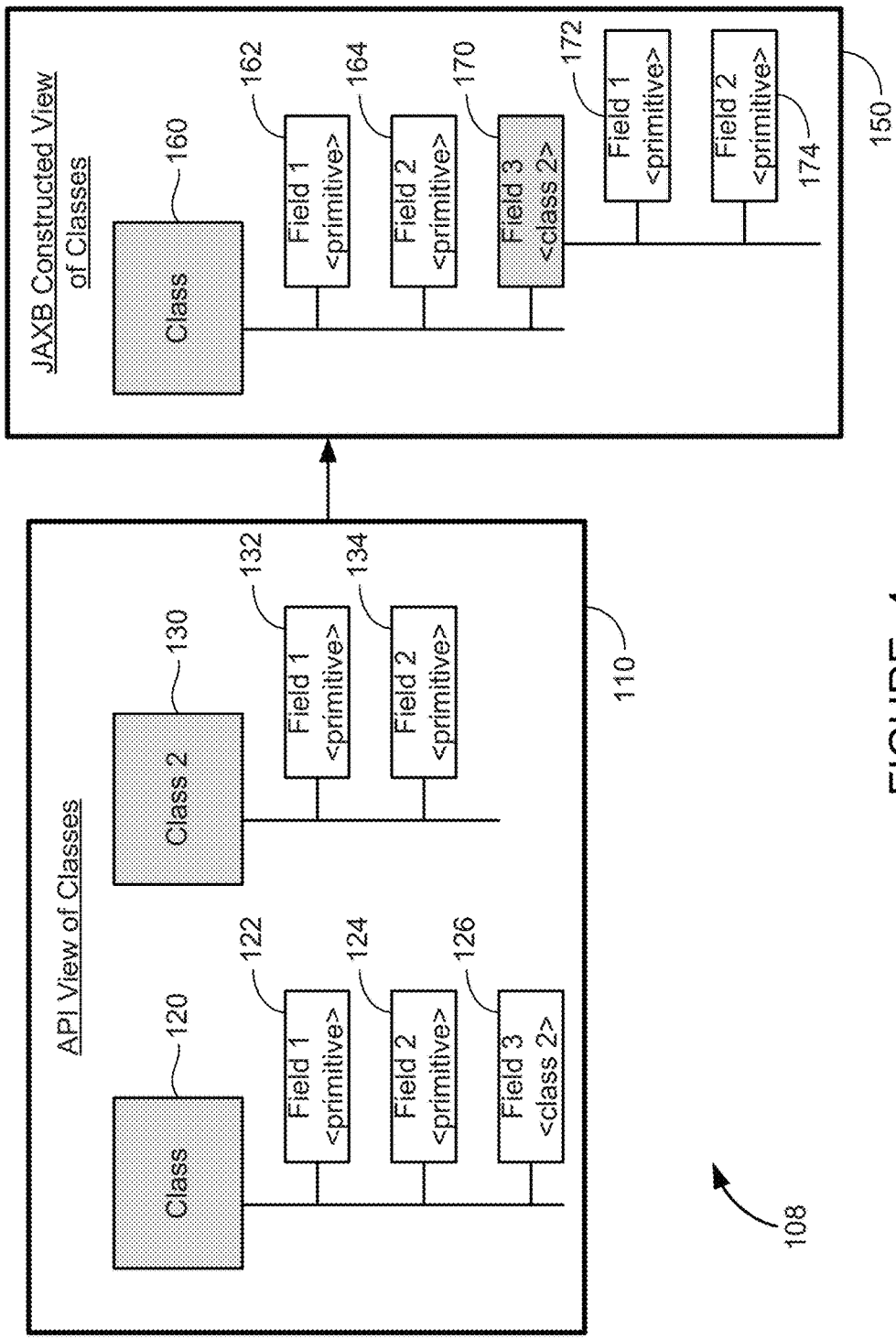
FIG. 4 is an illustration of how a JAXB context is created from an API class structure.

When a new JAXB context is created, as in the second step of FIG. 3, the JAXB library has to use reflection to walk the classes to be serialized and build at runtime a tree to show what to do. FIG. 4 is an illustration 108 of how a JAXB context is created from an API class structure. Box 110 shows the API view of the classes, including a Class 120 and a Class 2 130. The Class 120 includes three fields 122-126 as shown—the first two being primitives and the third being a sub-class. The Class 2 130 includes fields 132-134, both of which are primitives. JAXB uses reflection to walk down the API class structure of the box 110, expanding and interrogating as it goes, as illustrated in the follow series of queries;

What is Field 1 of Class? A primitive. What is it's value?
What is Field 2 of Class? A primitive. What is it's value?
What is Field 3 of Class? A subclass (Class 2).
What is Field 1 of Class 2? A primitive. What is it's value?
What is Field 2 of Class 2? A primitive. What is it's value?
Any more fields in Class 2? No.
Any more fields in Class? No.
OK. Done.

Box 150 shows the JAXB constructed view of the same classes defined in the API classes of the box 110, where the hierarchy of Class 2 and its fields under Class is shown. The process illustrated in FIG. 4 is done in the context step rather than the marshalling step because reflection can be quite slow. In fact, on some larger objects, it can take well over 30 seconds on a standard desktop computer to construct the JAXB context. Further, because this is done at runtime, there is no mechanism for the compiler to make optimizations and reduce the amount of memory these JAXB contexts take up, especially if the library has one context for its serialization and the user has another context for their serialization.

As a result of the above two factors, an application which simply uses JAXB-generated reflection to expand a class structure, and writes API-compliant XML data out to the wire—as shown for the application 12 of FIGS. 1-2—will run slowly and produce undesirably large encoded data outputs, particularly if the classes of data to be output are large and complex.

As mentioned above, some systems are specified such that the API data classes are standardized but the wire protocol is not. In these cases, it is possible to encode/decode data that is formatted more efficiently for transport over the wire. However, such improvements are not possible if using the standard JAXB generator 90 shown in FIG. 2—as illustrated below.

FIG. 5 is a listing 180 of a Sample XML message defined as a schema element, as would be included in the Public API 80. It can be seen that the XML shown in FIG. 5 is a very simple data type, containing no subclasses and only primitives. FIG. 6 is a listing 190 showing a partial JAXB output from the Sample XML document of FIG. 5, as would be produced by the JAXB generator 90. The output class in the listing 190 contains only that data which is need to serialize the XML message. For example, there is no metadata to indicate an ID for the class which makes this structure unusable for a more intelligent class expansion and serialization.

A somewhat trivial alternative to the above is to create a generator which copies the JAXB class field-by-field and places it into internal structure. FIG. 7 is a listing 200 of an encoding-specific class to take the Sample XML message and encode it as XML. It should be noted regarding the listing 200 that each encoding requires a special purpose generator. If the application needs three different encodings (e.g., XML, JSON, ASN.1), then the user has to write three different generators. This can be error prone and the size of the libraries will grow with each addition protocol supported.

Other alternatives to the above exist—such as creating large lists of lookup tables to go from the first metadata to the second. These brute force approaches may be practical on a small scale, but are time-consuming with large message lists. Based on all of the above discussion, a need was recognized for a more elegant technique for efficiently expanding object classes and serializing the data.

For systems which are specified such that the API is standardized but the wire protocol is not, a different architecture may be employed by an application developer which uses streamlined, fast-executing Java to encode/decode data that is formatted as compactly as possible for transport over the wire. If the standard is a language that supports reflection (Java, C#, etc.), the API is defined by a series of concrete classes, and the standard allows implementation-specific write/read methods with proprietary wire format—then this different architecture and technique, outlined below, can be used to greatly improve the application speed and the required communications bandwidth of the proprietary implementation. In order to construct this solution, three key parts are needed (discussed below): a generator to produce the shadow classes; a set of field classes that will house the metadata; and some encoder libraries that understand the shadow class structure.

Figure 8:
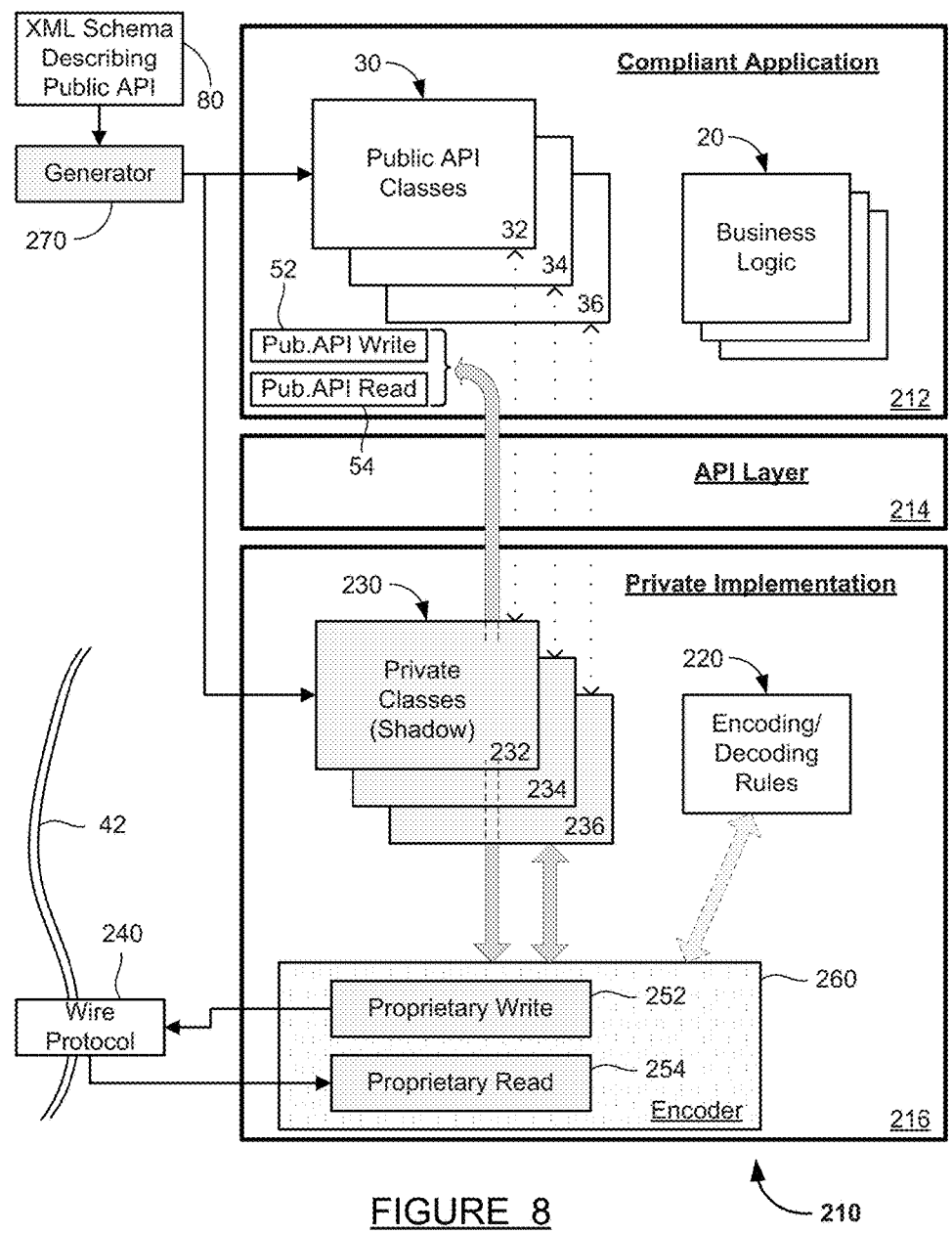
FIG. 8 is an illustration of an application architecture which can dramatically increase the speed of data encoding and reduce the size of the encoded objects, according to an embodiment of the present invention.

FIG. 8 is an illustration of an application architecture 210 which can dramatically increase the speed of data encoding and reduce the size of the encoded objects, according to an embodiment of the present invention. An API-compliant application 212 includes business logic 20, in the same manner as the application 12 discussed above. The application 212 employs a data model described in the API XML schema 80 as before, with the public data classes 30—including specific classes 32, 34, 36, etc. The business logic 20 defines the calculations upon, and uses for, the data in the classes 30. The public API write module 52 is available to write API data classes out to the standard wire protocol 40, and the public API read module 54 is available to read API-compliant data via wire protocol 40, as discussed before with respect to FIGS. 1-2.

The architecture 210 includes an API layer 214, which simply represents a layer across which the application 212 communicates in an API-compliant manner. That is, only the public API data classes 30 may be communicated in and out of the application 212 across the API layer 214, as discussed previously. The architecture 210 also includes a private implementation 216. The private implementation 216 is designed to communicate with the application 212 across the API layer 214. Now, however, instead of using the JAXB generator 90 and only encoding/decoding XML data for transport over the wire as in the application 12 of FIG. 2, a new approach is used. This new approach, where the private implementation 216 uses proprietary metadata about the public API classes 30 to speed up encoding/decoding, is discussed in detail below.

The architecture 210 uses a set of private data classes 230, described herein as shadow classes, in the private implementation 216—including a shadow class 232 corresponding to the public class 32, a shadow class 234 corresponding to the public class 34, a shadow class 236 corresponding to the public class 36, etc. The private shadow classes 230 contain metadata about their corresponding public data classes 30, where the metadata along with a set of encoding/decoding rules 220 enable the increased execution speed and decreased object size described above. The private implementation 216 uses a wire protocol 240 which is proprietary according to the encoding/decoding rules 220, where encoded objects are transported in and out of the private implementation 216 over the wire 42—which may be a data bus or another type of network such as Ethernet, just as in FIGS. 1-2.

Ignoring Java code generation for a moment, a high level explanation of the architecture 210 is as follows: when the application 212 wants to share data with other applications, the application 212 calls the public API write module 52. Then an encoder 260 takes the data to be shared from the public data classes 30 (via the write module 52), along with the metadata in the corresponding private shadow classes 230, and encodes the data from the public classes 30 using a proprietary write module 252. The encoder 260 is developed based on the encoding/decoding rules 220, which indicate what metadata will be contained in the shadow classes 230 corresponding to the API classes 30. A proprietary read module 254 works in the same way to decode data received on the wire 42 and provide that data in an API-compliant manner to the public API read module in the application 212. Because the knowledge of the class structure contained in the shadow classes 230 allows avoidance of Java reflection, and because the shadow metadata enables simplification of the encoded data compared to XML, the encoding/decoding operations are much faster, and the resulting encoded object size is much smaller, than if JAXB-generated XML was transported over the wire as in the application 12.

Now returning to the subject of Java code generation; because the private implementation 216 does not use standard JAXB-based XML encoding, the JAXB generator 90 of FIG. 2 is no longer useful. In its place is a generator 270 which creates not only the public API classes 30 according to the API XML schema 80 as before, but also the private shadow classes 230 according to the proprietary logic of the private implementation 216. That is, given the API XML schema 80, the generator 270 writes Java code defining the public data classes 30 and the private shadow classes 230, where the shadow classes 230 contain metadata enabling efficient encoding/decoding of the data in the public classes 30. The generator 270 is developed based on the predetermined proprietary knowledge of what metadata is to be contained in the shadow classes 230 corresponding to the API classes 30, as also contained in the encoding/decoding rules 220 discussed above.

A key feature of the shadow classes 230 is that they enable a full understanding of the public API classes 30 without using reflection. For example, the shadow class 232 defines data about the public API class 32—including what fields are contained in the class 32, whether each field is a primitive or an object, what type of primitive, etc.

FIG. 9 is a listing 290 of an example of metadata for the Sample class discussed previously. The listing 290 is an example of a shadow class created by the generator 270 of the architecture 210. It can be seen in the listing 290 that the code does not tell the application (the private implementation 216) how to use the metadata presented. That business logic is left to the encoder 260 (again, based on the encoding/decoding rules 220) as every encoding is different. Instead, the shadow class (232, 234, etc.) only contains a list of fields and metadata the generator 270 provided which might be useful to different encodings of the corresponding public API class (32, 34, etc.). For XML encodings, the fields are given a namespace and a preferred tag. For raw binary encodings, the fields are given some Boolean metadata like if the field is required or not.

Each field in the shadow class has metadata describing the field. For example, in the Sample class, the "Uptime" field and its metadata (corresponding to the same field in the API class seen in FIG. 6) are shown at 292. Each data type has its own field type as each field type might need different amounts of metadata. In the example of the listing 290, the byte array 294 has an extra Boolean field (should the encoding prefer hex or base64) which the other fields don't have nor need.

Another piece of this shadow class methodology is metadata related to the class at large, seen at 296 in FIG. 9. In the example, the Sample class has been assigned a code of 22, which binary protocols can use in place of the string class name and namespace. This shorthand simplification enabled by the shadow class metadata is significant—enabling lengthy character strings to be replaced by a 2-digit integer for writing to the wire 42. Also seen in the class metadata 296 is a listing of all fields within the Sample class, allowing encoders to walk the array without having to use reflection at runtime to figure out what fields are present. This allows the encoders (such as the encoder 260 of the architecture 210) to run extremely fast compared to the JAXB code discussed above.

To summarize the above discussion, the generator 270 creates the public API classes 30 in the compliant application 212, and also creates the corresponding shadow classes 230 in the private implementation 216, where the shadow classes 230 contain metadata about the API classes and fields according to a proprietary set of business rules. The business rules defining what shadow metadata corresponds with different types of API objects, and how to use the class data and the metadata in different encodings, is contained in the encoding/decoding rules 220.

As discussed above, the shadow class architecture includes the encoder 260 which understands the business rules for using the shadow class metadata to efficiently transform the API object class into a binary blob to put on the wire 42 (and vice versa for read). In actuality, multiple encoders may be required, such as an XML encoder and a raw binary encoder. FIG. 10 shows what three different encoder calls might look like in the private implementation 216—one for an XML encoder, one for a JSON encoder, and one for an ASN.1 encoder. Note that the encoder calls are extremely simple—just two lines each. Thus, the generator 270 which creates the shadow classes 230 does not need to write lengthy serialization script—it just needs to include two lines to call an XML encoder, or a JSON encoder, or whatever is needed. Likewise, the encoder 260 simply needs to know how to interpret the shadow class metadata in order to serialize or de-serialize the API class data in the format which it supports (XML, raw binary, JSON, etc.).

Figure 11:
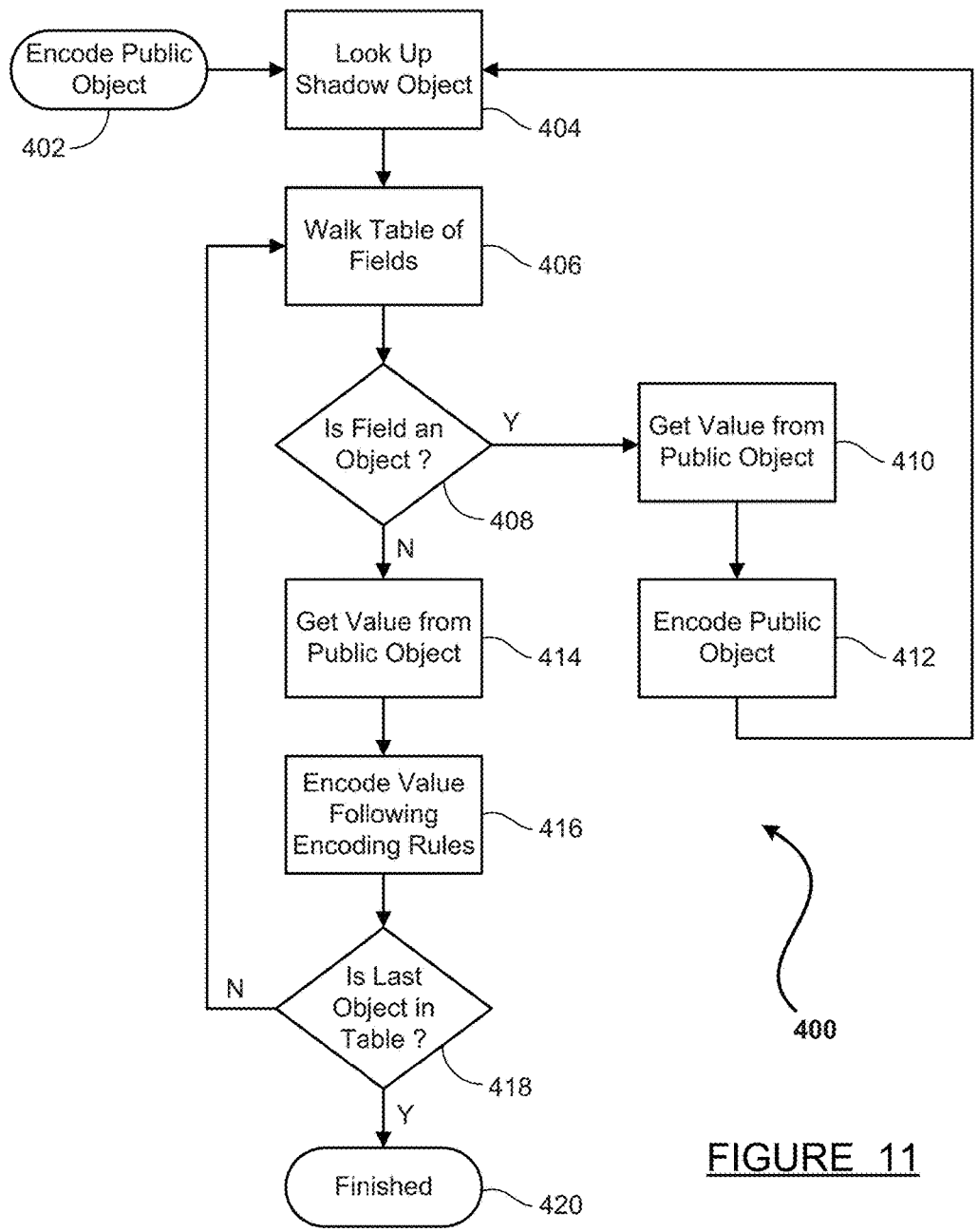
FIG. 11 is a flowchart diagram of a method used by the encoder of FIG. 8 for encoding an API object using shadow metadata, according to embodiments of the present invention.

FIG. 11 is a flowchart diagram 400 of a method used by the encoder 260 described above, regardless of which wire format it supports. At box 402, encoding of a public API object is initiated, such as by one of the encoder calls shown in FIG. 10. For example, there may be a need to encode the API class 32 as binary and place it on the wire. For discussion purposes, consider the API class 32 to be the Sample class discussed above. At box 404, the encoder 260 looks up the corresponding shadow object, which in this case is the shadow class 232, and any class information related to the class 32 is encoded (as shown at 296 of FIG. 9). As shown in FIG. 9, the shadow class 232 includes the metadata about the API class 32, which in this case is the listing of fields in the Sample class, and the metadata about the fields.

At box 406, the table of fields is walked through, as discussed above. It is important to recognize that when the encoder is walking through the fields in the flowchart diagram 400, it is not necessary to use Java reflection, because the field listing for the class structure is already provided in the shadow class 232 which has been looked up. The avoidance of using reflection at runtime allows the encoder to run very fast.

At decision diamond 408, it is determined whether the field which is currently being processed is an object. If the field is an object (that is, not a primitive), then at box 410 the value of the public object is retrieved from the public classes 30, and at box 412 the public object is encoded. The public object encoding at the box 412 is essentially just the encoder 260 calling itself with a different object; therefore, the process loops back to the box 404 to look up the shadow object corresponding to the new/different public object, then proceeds to the box 406 to walk the table of fields for the different object.

If, at the decision diamond 408, it is determined that the field is not an object (that is, that the field is a primitive, which is a data type that is composed of no other data types and cannot be broken down any further), then at box 414 the value of the field is retrieved from the public classes 30. At box 416, the value of the field is encoded following the encoding rules from the encoding/decoding rules 220. As discussed above and shown in FIG. 9, the encoder 260 knows how to interpret the metadata in the shadow class 232 to correctly and efficiently encode the data in the API class 32. For example, if the encoder 260 is encoding to a proprietary raw binary format (as opposed to XML), then it is possible to dramatically reduce the size of the encoded object which goes out on the wire—as many shorthand abbreviations are possible as compared to the fully verbose XML listing. One such shorthand notation is the Sample class code (22) discussed above in FIG. 9, where the "22" replaces the strings class name and namespace. Other shorthand simplifications are also possible—such as not including field names and field types in the encoded object, because these values are known from the shadow class 232 and will be known by any decoder which is designed to use the proprietary encoded object from the private implementation 216.

At decision diamond 418, it is determined whether the object currently being processed is the last object in the class table, and if so, the method completes at terminus 420. If more objects remain in the class table, the method returns to the box 406 to continue on to the next field.

The encoding method of the flowchart 400 is employed for serializing to any encoded object format (XML, JSON, proprietary binary, etc.), where a unique version of the encoder 260 is required for each wire format. The shadow class metadata is used in the encoder 260 to preclude the need for reflection to expand the class structure, thereby increasing encoding/decoding speed. The shadow class metadata also enables a dramatic reduction in size of the binary encoded objects, which reduces bandwidth requirements and improves performance of communications over the wire 42.

A decoding process performed by the read module 254 of the encoder 260 can easily be envisioned as the reverse of the encoding process described above. That is, the binary object is read from the wire 42, and based on the class code the shadow metadata is looked up and used to expand the serialized object back into the API compliant classes 30 via the public API read module 54 in the compliant application 212.

It is to be understood that the software applications and modules described above are executed on one or more computing devices having a processor and a memory module. For example, the generator 270 may be executed on an office computer or server at the hands of a developer. The compliant application 212 and the private implementation 216 may run on a controller in a vehicle, an aircraft or some other machine. Furthermore, various systems and applications which are part of the vehicle/aircraft/machine may read messages on the wire 42, perform calculations and take actions based on the data in those messages (such as an autopilot reacting to an altitude signal), and put their own messages back on the wire 42.

The techniques discussed above for providing shadow metadata describing a public data class offer many advantages over traditional methods. These advantages include much faster serialization than prior art methods by virtue of minimizing the use of Java reflection at runtime for encoding, and much smaller binary encoded object size by virtue of shorthand abbreviations made possible by the metadata. Furthermore, the disclosed technique allows the separation of serialization logic from the metadata, and allows independent selection of encoding protocols, where each new encoding is a small addition to the application.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for serializing object data for communication on a network in a system, said method comprising:
providing an Application Program Interface (API) document including XML schema defining public API data classes;
providing an API-compliant application running on a processor connected to the network, including program code defining the public API data classes;
providing a private application running on the processor and communicating with the API-compliant application, including program code defining a set of shadow classes, where each one of the shadow classes corresponds to one of the public API data classes, and where the shadow classes contain metadata about their corresponding API data class;
determining, by the API-compliant application, that a certain API data class is to be encoded and communicated on the network;
encoding, by an encoder module in the private application, the certain API data class, including looking up the shadow class corresponding to the certain API data class, using the metadata in the shadow class to expand the API data class without using reflection, and serializing the certain API data class; and
providing the certain API data class after serializing for transport on the network.

2. The method according to claim 1 wherein the shadow classes include metadata defining a structure of sub-classes and primitives for the corresponding API data class, and metadata defining each field in the structure.

3. The method according to claim 2 wherein the metadata defining each field in the structure includes a field name, a field type and parameters defining usage of the field.

4. The method according to claim 1 wherein encoding the certain API data class includes stepping through a table of fields of the expanded API data class and, for each field, determining if the field is an object or a primitive, getting a value of the field, encoding the field if it is a primitive, and looking up a corresponding shadow class for and recursively encoding the field if it is an object.

5. The method according to claim 1 wherein serializing the certain API data class includes serializing the certain API data class in a proprietary binary format.

6. The method according to claim 5 wherein serializing the certain API data class in a proprietary binary format includes using the metadata in the shadow class to create shorthand simplifications for fields in the API data class, where the shorthand simplifications reduce a serialized object size.

7. The method according to claim 6 wherein the shorthand simplifications for fields in the API data class include using a numeric code to designate a class name, where the numeric code also defines a list of the fields in the API data class and a type of data in the fields.

8. The method according to claim 1 wherein serializing the certain API data class includes serializing the certain API data class in a format selected from the group consisting of XML, ASN.1 and JSON.

9. The method according to claim 1 further comprising receiving from the network, by the encoder module, serialized data for a particular API data class, looking up the shadow class corresponding to the particular API data class, de-serializing the serialized data using metadata in the corresponding shadow class, and providing the particular API data class to the API-compliant application.

10. The method according to claim 1 wherein the program code defining the public API data classes in the API-compliant application and the shadow classes in the private application are created by a generator application based on a set of encoding rules which is also known to the encoder module.

11. The method according to claim 1 wherein the program code is Java or C#.

12. The method according to claim 1 wherein the system is a land vehicle or an aircraft, and other applications on the network receive and process the certain API data class and trigger an action in a sub-system of the land vehicle or aircraft based on information in the API data class.

13. A method for serializing object data for communication on a network in a system, said method comprising:
providing an Application Program Interface (API) document including XML schema defining public API data classes;
providing an API-compliant application running on a processor connected to the network, including Java program code defining the public API data classes;
providing a private application running on the processor and communicating with the API-compliant application, including Java program code defining a set of shadow classes, where each one of the shadow classes corresponds to one of the public API data classes, and where the shadow classes contain metadata about their corresponding API data class, including metadata defining a structure of sub-classes and primitives for the corresponding API data class, and metadata defining each field in the structure;
determining, by the API-compliant application, that a certain API data class is to be encoded and communicated on the network;
encoding, by an encoder module in the private application, the certain API data class, including looking up the shadow class corresponding to the certain API data class, using the metadata in the shadow class to expand the API data class without using reflection, stepping through a table of fields of the expanded API data class and, for each field, determining if the field is an object or a primitive, getting a value of the field, encoding the field if it is a primitive, and looking up a corresponding shadow class for and recursively encoding the field if it is an object; and
providing the certain API data class after encoding for transport on the network.

14. The method according to claim 13 wherein encoding the certain API data class includes encoding the certain API data class in a proprietary binary format using the metadata in the shadow class to create shorthand simplifications for fields in the API data class, where the shorthand simplifications reduce a serialized object size.

15. The method according to claim 13 further comprising receiving from the network, by the encoder module, serialized data for a particular API data class, looking up the shadow class corresponding to the particular API data class, de-serializing the serialized data using metadata in the corresponding shadow class, and providing the particular API data class to the API-compliant application.

16. A system for serializing object data for communication on a network, said system comprising:
a server computer having a processor, memory and storage, where the server computer includes in the storage an Application Program Interface (API) document including XML schema defining public API data classes, and the server computer runs on the processor a generator application which creates program code defining the public API data classes based on the XML schema and program code defining a set of shadow classes based on a set of business rules, where each one of the shadow classes corresponds to one of the public API data classes, and where the shadow classes contain metadata about their corresponding API data class, including metadata defining a structure of sub-classes and primitives for the corresponding API data class and metadata defining each field in the structure; and
a controller connected to the network, said controller running an API-compliant application including the program code defining the public API data classes, said controller also running a private application communicating with the API-compliant application, said private application including the program code defining the set of shadow classes;
where the API-compliant application includes logic for determining that a certain API data class is to be encoded and communicated on the network,
and the private application includes an encoder module for encoding the certain API data class, including looking up the shadow class corresponding to the certain API data class, using the metadata in the shadow class to expand the API data class without using reflection, serializing the certain API data class and providing the certain API data class after serializing for transport on the network.

17. The system according to claim 16 wherein the encoder module includes logic for stepping through a table of fields of the expanded API data class and, for each field, determining if the field is an object or a primitive, getting a value of the field, encoding the field if it is a primitive, and looking up a corresponding shadow class for and recursively encoding the field if it is an object.

18. The system according to claim 16 wherein the encoder module serializes the certain API data class in one of; a proprietary binary format, XML, ASN.1 or JSON.

19. The system according to claim 18 wherein the encoder module, when serializing the certain API data class in a proprietary binary format, uses the metadata in the shadow class to create shorthand simplifications for fields in the API data class, where the shorthand simplifications reduce a serialized object size, and where the shorthand simplifications for fields in the API data class include a numeric code to designate a class name, where the numeric code also defines a list of the fields in the API data class and a type of data in the fields.

20. The system according to claim 16 wherein the encoder module is also configured for receiving from the network serialized data for a particular API data class, looking up the shadow class corresponding to the particular API data class, de-serializing the serialized data using metadata in the corresponding shadow class, and providing the particular API data class to the API-compliant application.

\* \* \* \* \*